United States Patent
Spitzer et al.

(10) Patent No.: US 6,947,049 B2
(45) Date of Patent: Sep. 20, 2005

(54) METHOD AND SYSTEM FOR SYNCHRONIZING UPDATES OF VERTEX DATA WITH A GRAPHICS PROCESSOR THAT IS FETCHING VERTEX DATA

(75) Inventors: John Fredric Spitzer, Austin, TX (US); Mark J. Kilgard, Austin, TX (US)

(73) Assignee: Nvidia Corporation, Santa Clara, CA (US)

(*) Notice: Subject to any disclaimer, the term of this patent is extended or adjusted under 35 U.S.C. 154(b) by 0 days.

(21) Appl. No.: 09/872,508

(22) Filed: Jun. 1, 2001

(65) Prior Publication Data

US 2003/0001840 A1 Jan. 2, 2003

(51) Int. Cl.[7] .............................................. G06T 15/00
(52) U.S. Cl. ........................................ 345/522; 345/501
(58) Field of Search ................................ 712/216, 217, 712/218, 219; 710/5, 22; 345/522, 521, 582, 537, 506, 532, 531, 520, 501; 711/158

(56) References Cited

U.S. PATENT DOCUMENTS

| | | | | |
|---|---|---|---|---|
| 6,047,334 A | * | 4/2000 | Langendorf et al. ........... 710/5 |
| 6,201,547 B1 | * | 3/2001 | Rogers et al. ............... 345/582 |
| 6,456,290 B2 | * | 9/2002 | Parikh et al. ............... 345/522 |

* cited by examiner

Primary Examiner—Matthew C. Bella
Assistant Examiner—Dalip K. Singh
(74) Attorney, Agent, or Firm—Wagner, Murabito & Hao LLP

(57) ABSTRACT

A method and system for synchronizing updates of vertex data by a processor with a graphics accelerator module that is fetching vertex data is disclosed. The method and system comprises providing vertex array range (VAR) and writing vertex data into the VAR. The method and system includes providing a command into a command stream of the graphics accelerator module indicating that the vertex data has written into the VAR, and providing a fence condition based upon the command. A system and method in accordance with the present invention thus permits extremely high vertex processing rates via vertex arrays or vertex buffers even when the processor lacks the necessary data movement bandwidth. By passing indices in lieu of the vertex data, the processor is capable of keeping up with the rate at which a vertex engine of the graphics accelerator module can consume vertices. In operation, the processor passes vertex indices to the hardware and lets the hardware "pull" the actual vertex data via direct memory access (DMA).

36 Claims, 8 Drawing Sheets

METHOD AND SYSTEM FOR SYNCHRONIZING UPDATES OF VERTEX DATA WITH A GRAPHICS PROCESSOR THAT IS FETCHING VERTEX DATA

FIELD OF THE INVENTION

The present invention relates generally to computer graphics and, more particularly, to a system and method for accessing graphics vertex data.

BACKGROUND OF THE INVENTION

In graphics processing, much data is managed in order to provide a resultant image on a computer display. One form of such data includes vertex data that comprises information for displaying triangles, lines, points or any other type of portions of an image on the computer display. Prior Art Table 1 includes an example of typical vertex data.

| Prior Art Table 1 |
|---|
| position (X Y Z W) |
| diffuse (R G B A) |
| specular (R G B F) |
| texture0 (S T R Q) |
| texture1 (S T R Q) |

Together, multiple sets of such vertex data are used to represent one of the portions of the image. In order to accomplish this, each vertex, on average, requires 40 bytes of memory storage space. During conventional system operation, over 10 million vertexes are typically exchanged every second during processing. This results in a data transfer rate of 400 MB/s During the processing of vertex data, various components of a system come into play. Prior Art FIG. 1 illustrates an example of a system 10 that processes vertex data. As shown, included are a processor 12, system memory 14, a graphics accelerator module 16, and a bus 18 for allowing communication among the various components.

In use, the processor 12 locates the vertex data in the system memory 14. The vertex data is then routed to the processor 12, after which the vertex data is copied for later use by the graphics accelerator module 16 by the module 16 directly accessing the system memory 14. The graphics accelerator module 16 may perform various operations such as transform and/or lighting operations on the vertex data.

As mentioned earlier, a typical data transfer rate of 400 MB/s is required in current systems to process the vertex data. During the transfer of such data in the system 10 of Prior Art FIG. 1, the bus 18 connecting the processor 12 and the graphics accelerator module 16 is required to handle an input data transfer rate of 400 MB/s along with an output data transfer rate of 400 MB/s.

As such, the foregoing bus 18 must accommodate a data transfer rate of 800 MB/s while handling the vertex data. Conventionally, such bus 18 is 64 bits wide and the processor 12 runs at about 100 MB/S. Therefore, the bus 18 is often strained during use in the system 10 of Prior Art FIG. 1. Further, with data transfer rates constantly rising, processors will soon not be able to be used to copy vertex data.

A conventional graphics accelerator module 16 has the ability to read vertex data by one of two means. The vertex data can be supplied either in-band through the command stream of the graphics accelerator module 16 can be configured to read vertex data supplied in-band in its command stream.

In-band vertex data may be presented in an "immediate mode" as illustrated below:

| SetDiffuseColor0 |
|---|
| R0 |
| G0 |
| B0 |
| Vertex0 |
| X0 |
| Y0 |
| Z0 |
| SetDiffuseColor1 |
| R1 |
| G1 |
| B1 |
| Vertex1 |
| X1 |
| Y1 |
| Z1 |

The single indented lines (SetDiffuseColor, Vertex) represent in a preferred embodiment 32-bit command tokens. The multiple doubly indented lines (RGB, XYZ) following the command tokens in a preferred embodiment are multiple 32-bit words of data for the preceding command. The above example involves sending data for two immediate mode vertices.

The in-band vertex data may also be packed together based on an "inline" vertex array format. First the format for vertex data is defined by commands in the command stream. For example:

SetDiffuseColorArrayFormat
    expect 3 RGB floats
    SetVertexArrayFormat
    expect 3 XYZ floats, stride is six floats Then vertex data can be sent more efficiently with minimal command token overhead because the format of the vertex data is pre-established by the inline format.

Then vertex data can be sent like:
    InlineArray
    R0
    G0
    B0
    X0
    Y0
    Z0
    R1
    G1
    B1
    X1
    Y1
    Z1

In this example, the extra overhead from SetDiffuseColor and Vertex command tokens is eliminated when using inline data.

A copending application entitled, "System, Method and Article of Manufacture for Allowing Direct Memory Access to Graphics Vertex Data While Bypassing a Processor", filed on Dec. 16, 1999 and assigned to the assignee of this application, a second means for reading vertex data, is disclosed. In this application, the graphics accelerator module is supplied with the vertex array offsets and strides in addition to the vertex array formats. The offsets are relative to the beginning of a pre-established region of memory shared between the graphics accelerator module and CPU. This memory is often a high-bandwidth uncached AGP (Advanced Graphics Port) memory though it may also be "video memory" within the graphics hardware or cached system memory. The CPU is responsible for writing vertex data into this memory region. This shared memory region is called a "vertex array range".

Accordingly, rather than passing the vertex data in-band through the command stream, the command stream contains only vertex indices that indicate where the graphics accelerator module should read the corresponding vertex data for the given vertex index. The vertex array format, stride, and offset provide the information necessary to read the data for a specified vertex index out of the current vertex array range.

In this approach, the format, offset, and stride is first defined by commands in the command stream. For example:
SetDiffuseColorArrayFormat
expect 3 RGB floats, stride is 6 floats
SetDiffuseColorArrayOffset
200 bytes from the shared memory region beginning
SetVertexArrayFormat
expect 3 XYZ floats
SetVertexArrayOffset
212 bytes from the shared memory region beginning Then the vertex data is written into the vertex array range. For example:

| 200 | R0 |
|---|---|
| 204 | G0 |
| 208 | B0 |
| 212 | X0 |
| 216 | Y0 |
| 220 | Z0 |
| 224 | R1 |
| 228 | G1 |
| 232 | B1 |
| 236 | X1 |
| 240 | Y1 |
| 244 | Z1 | where the given vertex data components are written at the indicated byte offsets from the beginning of the vertex array range.

Once the vertex array range is set up in the manner described, the graphics accelerator module can much more efficiently generate vertices by reading the required vertex data from the vertex array range via an ArrayElement command token as necessary rather than reading all the vertex data in-band through the command stream.
For example:
ArrayElement
0
1

This simple command would instruct the graphics accelerator module to read the vertices (X0, Y0, Z0, R0, G0, B0) and (X1, Y1, Z1, R1, G1, B1) from the vertex a vertex indices in the graphic accelerator module's command stream is substantially more efficient than sending the vertex data inline for several reasons.

Firstly, three dimensional (3D) models are represented as meshes of vertices, where the triangles making up the models tend to share vertices, and therefore share the same vertex data. Consider a cube with six faces. Each square face is formed by two triangles. Each triangle has three vertices. If the cube is drawn as twelve (12) independent triangles, the vertex data must be supplied thirty-six (36) times even though a cube has only eight (8) unique vertices.

Using a vertex array range as described above, the data for the 8 unique vertices can be copied into the vertex array range once. Then the 36 vertex indices can be sent to the graphics accelerator module via its command stream. If each vertex is a 6 32-bit float and each vertex index is a 16-bit value, this is a 12-fold reduction in the data that must be written by the CPU and read by the graphic accelerator modules through the graphic accelerator module's command stream.

The second advantage of using a vertex array range is that the graphic accelerator module can cache the reads it performs to the vertex array range so if vertex data from the vertex array range is already in the graphic accelerator module's vertex cache, the data does not have to be read again. Often vertex data is read into the cache, and subsequently, other data from the same cache line is often read for different vertices.

The third advantage of using a vertex array range is that if a vertex is transformed, its transformed results can be cached. If the same vertex index is issued again and the vertex index's transformed results are in the post-transform vertex cache (and no subsequent transform state settings have changed), the transformed vertex can be fetched from the cache rather than re-transforming the vertex again.

The cache in the second stated advantage is typically a memory-based cache of pre-transformed vertex data. The cache in the third stated advantage is a vertex index-based cache of post-transformed vertex data. Both caches provide substantially gains in the efficiency of vertex transformation and reduced bandwidth required for vertex data.

If a three-dimensional (3D) application is only required to draw static objects, the vertex data for all the static objects to be rendered can be written into the vertex array range. At this point, the objects can be rendered by configuring the vertex array range offsets, strides, and formats and sending vertex indices through the graphic accelerator module's command stream.

While some applications involve rendering static objects, games and other interactive 3D applications often render dynamic geometry such as animated characters in expansive virtual worlds. The vertex data is dynamic either because the 3D objects represented are animating in ways that require the vertex data to be updated repeatedly or the virtual world is so expansive that the entire world cannot be statically contained in the vertex array range. In these cases, the CPU is responsible for copying vertex data into the vertex array range on a continuous basis. The problem is that vertex data is not immediately read from the vertex array range when the ArrayElement command tokens are written into the graphic accelerator module's command stream. The command stream is a queue and so any previous commands must be processed before the ArrayElement command tokens are processed causing the vertex data to be read from the vertex array range and be transformed.

In practice, there is typically a substantial delay from when vertex data is written to the vertex array range and the ArrayElement command tokens are written in the command stream to when the vertex data is read from the vertex array range. The CPU is responsible for not modifying the sections of the vertex array range corresponding to vertex indices placed in the graphic accelerator module's command stream until the graphic accelerator module is finished reading the vertex data for the indices.

If the CPU fails to synchronize its writes to the vertex array range to sections that contain vertex data for pending vertex indices yet read, the result is non-deterministic corruption of the vertex data for the vertices being rendered. While this is not a fatal error, the result is incorrect rendering that is typically extremely corrupted and unacceptable. Correct rendering therefore requires proper synchronization between the CPU and the graphic accelerator module.

What is desired is an efficient synchronization mechanism so that the CPU can know when it is safe to re-write sections of the vertex array range that correspond to vertex indices that have been written into the graphic accelerator module's command stream.

The present invention addresses such a need.

SUMMARY OF THE INVENTION

A method and system for synchronizing updates of vertex data by a processor with a graphics accelerator module that is fetching vertex data is disclosed. The method and system comprises providing vertex array range (VAR) and writing vertex data into the VAR. The method and system includes providing a command into a command stream of the graphics accelerator module indicating that the vertex data has written into the VAR, and providing a fence condition based upon the command.

A system and method in accordance with the present invention thus permits extremely high vertex processing rates via vertex arrays or vertex buffers even when the processor lacks the necessary data movement bandwidth. In operation, the processor passes vertex indices to the hardware and lets the hardware "pull" the actual vertex data via direct memory access (DMA).

DETAILED DESCRIPTION

The present invention relates generally to computer graphics and, more particularly, to a system and method for accessing graphics vertex data. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
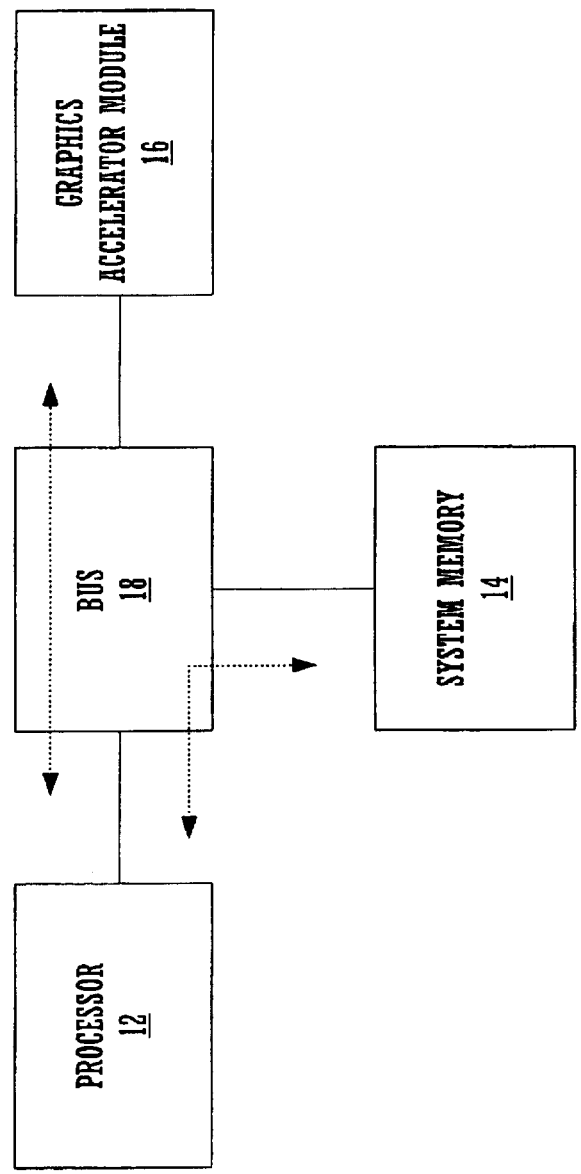
FIG. 1 is a block diagram illustrating the flow of vertex data in a system of the prior art.
Figure 2:
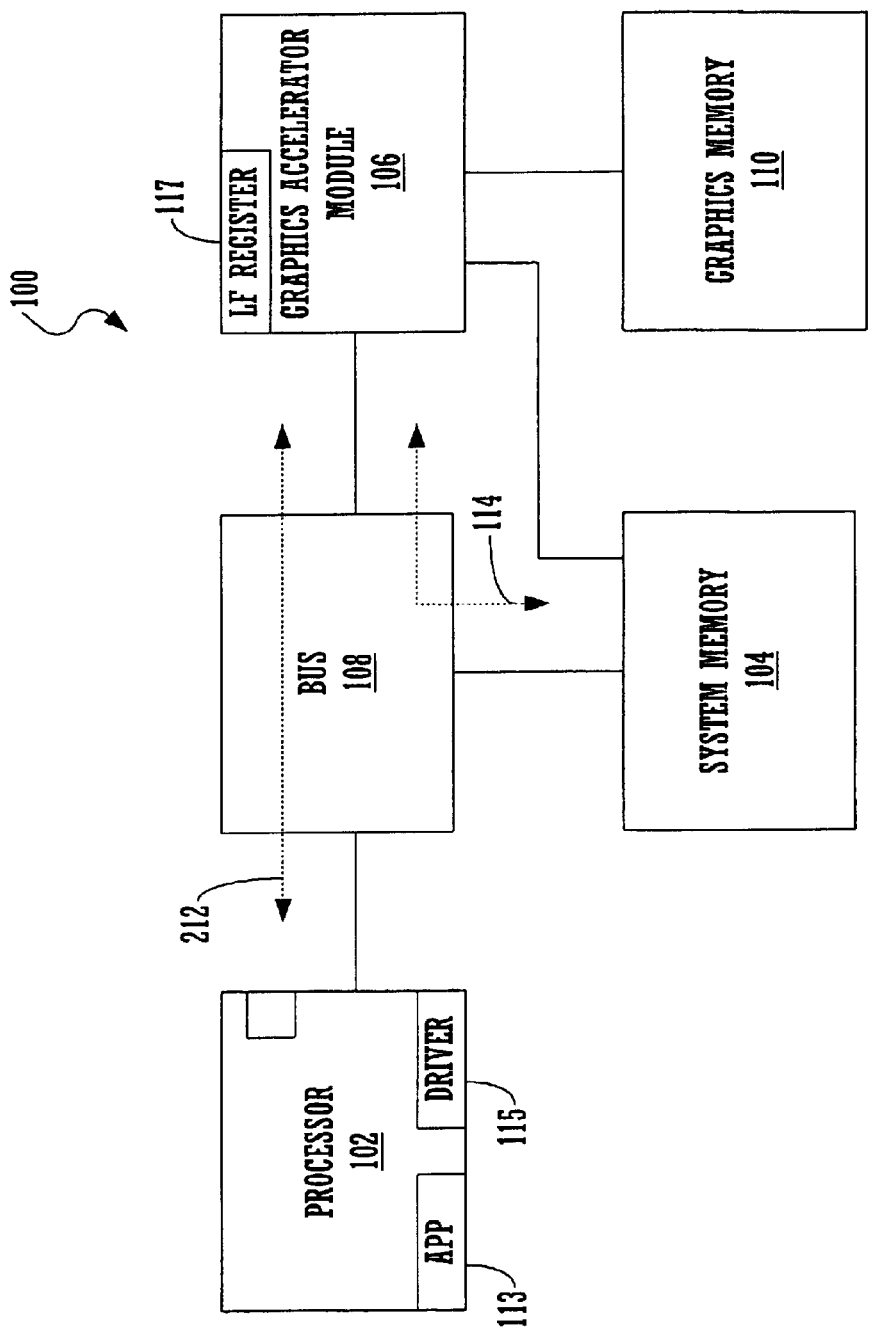
FIG. 2 is a block diagram illustrating the flow of the vertex data in accordance with one embodiment of the present invention.

FIG. 2 shows the flow of the vertex data during use of a system 100 in accordance with copending application entitled "System, Method and Article of Manufacture for Allowing Direct Memory Access to Graphics Vertex Data While Bypassing a Processor," filed on Dec. 6, 1999, Ser. No. 09/454,518. As shown, a processor 102, system memory 104, and a graphics accelerator module 106 are interconnected via a bus 108. Further, the graphics accelerator module 106 is equipped with graphics memory 110.

In operation, the vertex data is stored or loaded in memory. It should be noted that the memory in which the vertex data is stored may include the system memory 104 or the graphics memory 110 associated with the graphics accelerator module 106. Next, an index is received by the graphics accelerator module 106 which is representative of a portion of the vertex data in the memory. Note data flow path for index 112. From this a location is then determined in the memory in which the portion of the vertex data is stored. Such portion of the vertex data may thereafter be directly retrieved from the determined location in memory while bypassing the processor 102, as shown in data flow path 114. It should be noted that during such direct memory access (DMA), memory must be locked down in a manner that is well known to those of ordinary skill in the art.

Figure 3:
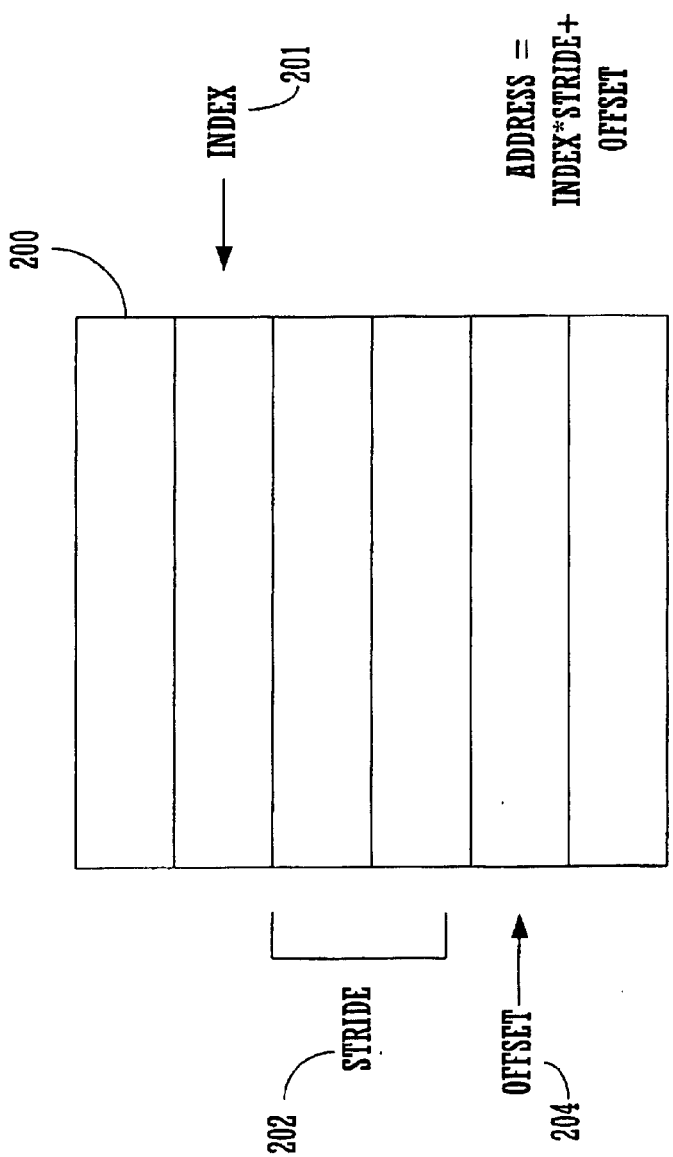
FIG. 3 is an illustration of vertex data stored in memory in accordance with one embodiment of the present invention.

As shown in FIG. 3, in one embodiment, the vertex data is stored in an array 200 including a plurality of components such as position (X Y Z W), diffuse (R G B A), specular (R G B F), texture0 (S T R Q), texture1 (S T R Q), fog (F), and/or any other components. For reasons that will soon become apparent, multiple additional components of the vertex data are provided including normal (Nx Ny Nz) and weight (W). It should be noted that the vertex data may include any type of components representative of various aspects of an image. An example of the various components of the vertex data of one embodiment of the present invention is shown in Table 2.

TABLE 2

| | |
|---|---|
| position (X Y Z W) | [stride0, offset0, format0] |
| diffuse (R G B A) | [stride1, offset1, format1] |
| specular (R G B F) | [stride2, offset2, format2] |
| texture0 (S T R Q) | [stride3, offset3, format3] |
| texture1 (S T R Q) | [stride4, offset4, format4] |
| fog (F) | [stride5, offset5, format5] |
| normal (Nx Ny Nz) | [stride6, offset6, format6] |
| weight (W) | [stride7, offset7, format7] |

In use, the foregoing vertex data may be employed to display portions, or triangles, of an image. Accordingly, different portions of the vertex data represent different portions of the image.

In order to identify a location in memory in which the vertex data is stored, a calculation is executed. Such calculation is carried out using an index 201 in addition to a stride value 202 and an offset value 204. With reference to FIG. 3, the calculation includes multiplying the index 201 by a stride value 202 and adding an offset value 204 thereto in order to determine the appropriate location in memory. It should be noted that the foregoing values are stored in associated registers.

As mentioned earlier, the vertex data includes a plurality of components. In one embodiment, each of such components has an associated stride value 202 and offset value 204 that are used in the foregoing calculation. Note Table 2. By assigning each component of the vertex data different index, stride and offset values, such components may be stored in different configurations.

Figure 4:
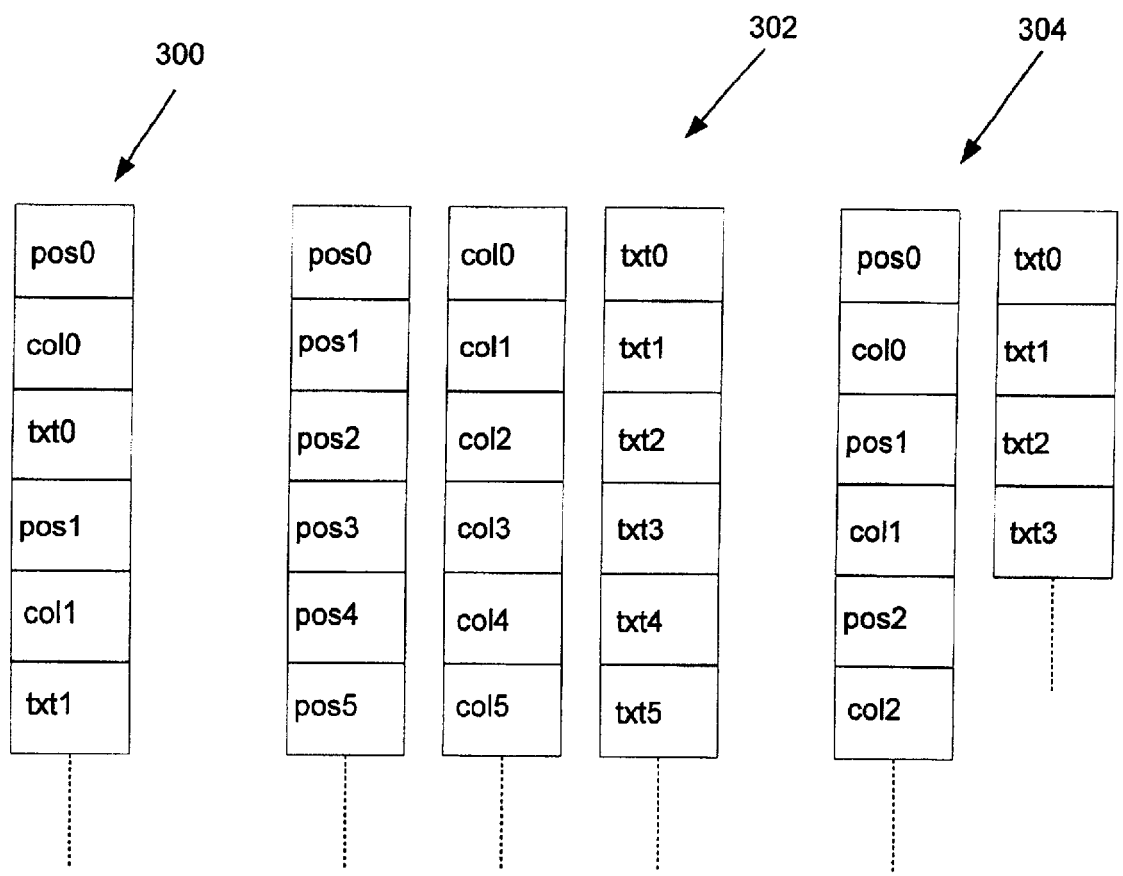
FIG. 4 is an illustration of possible configurations in which various components of the vertex data may be stored in accordance with one embodiment of the present invention.

FIG. 4 shows various examples of configurations in which the components of the vertex data may be organized. For example, the components of the vertex data may take on an interleaved configuration 300 with the components alternately situated in an array. In another example, the components of the vertex data may be independently separated in a second configuration 302. Still yet, a mixture of both interleaved and separate vertex configurations may be employed simultaneously, as in third configuration 304. In various other embodiments, the components may be configured in any other way that results in the data being separated. The various components of the vertex data may thus be retrieved independently from different locations in memory.

In addition to the stride and offset values, each of the components of the vertex data may have an associated format value. See Table 2. In one embodiment, the format value of the vertex data may include a size parameter, type parameter, and/or flag parameter.

The size parameter of the format value is indicative of a size of the corresponding component of the vertex data. 1, 2, 3, etc., are each acceptable values of the size parameter. It should be noted that a 0 value of size indicates a disabling function. Further, the type parameter of the format value represents an amount of memory required by an associated component of the vertex data. The type parameter may include values of "byte", "short", and "float" which indicate 1 byte, 2 bytes, and 4 bytes of memory, respectively. Finally, other types of flags may be employed to convey information other than the size and amount of memory represented by the components of the vertex data.

By way of example, in the case of the position (X Y Z W) value, if size=2 and type=float, it is known that only two parameters, i.e., XY, etc., each of 4 bytes (1 float) in length exist in memory. This facilitates efficient retrieval of the vertex data and further allows data compression by removing unwanted data. Unwanted data, for example, may include the W parameter of the position (X Y Z W) value during a transform and lighting operation. For the above example, it should be noted that internally appropriate defaults are supplied for unspecified elements, i.e., Z=0 and W=1.

As before mentioned, the system 100 of FIG. 2 considerably relieves the processor bus 108. The indices 201 typically consist of 16 bits of information and may be increased up to 32 bits or more. Further, the system 100 is typically required to handle approximately 10 million vertices per second, or more in future implementations. Accordingly, in the case where the vertices each consist of 16 bits, data enters the processor 102 via the processor bus 108 at 20 MB/s while data exits the processor 102 via the processor bus 108 at a similar rate of 20 MB/s. This results is in a total of 40 MB/s of data being handled by the processor bus 108 which is a considerable reduction with respect to the 800 MB/s required in prior art systems. Further, the processor cache is maintained by not passing large amounts of vertex data through it.

However, it has disadvantages. While some applications involve rendering static objects, games and other interactive 3D applications often render dynamic geometry such as animated characters in expansive virtual worlds. The vertex data is dynamic either because the 3D objects represented are animating in ways that require the vertex data to be updated repeatedly or the virtual world is so expansive that the entire world cannot be statically contained in the vertex array range. In these cases, the CPU is responsible for copying vertex data into the vertex array range on a continuous basis. The problem is that vertex data is not immediately read from the vertex array range when the ArrayElement command tokens are written into the graphic accelerator module's command stream.

In practice, there is typically a substantial delay from when vertex data is written to the vertex array range and the ArrayElement command tokens are written in the command stream to when the vertex data is read from the vertex array range. The CPU is responsible for not modifying the sections of the vertex array range corresponding to vertex indices placed in the graphic accelerator module's command stream until the graphic accelerator module is finished reading the vertex data for the indices.

If the CPU fails to synchronize its writes to the vertex array range to sections that contain vertex data for pending vertex indices yet read, the result is non-deterministic corruption of the vertex data for the vertices being rendered. While this is not a fatal error, the result is incorrect rendering that is typically extremely corrupted and unacceptable. Correct rendering therefore requires proper synchronization between the CPU and the graphic accelerator module.

Referring back to FIG. 2, a method and system in accordance with the present invention utilizes a "fence" mechanism and an accompanying driver 115 for synchronizing the graphics accelerator module and CPU to allow for rewriting a vertex array range of a memory. The processor 102 includes an application 113 that utilizes the fences and a driver 115 that generates the fences and provides for certain fence conditions. The graphics accelerator module 106 includes a register 117, referred to herein as a last finished reference register which is utilized to indicate whether a fence has been tested or is finished. The operation of the register 117 will be described in detail later in this specification.

A driver 115 provides commands related to a plurality of fence conditions. These fence conditions include but are not limited to: generating an unused name for a fence (glGenFencesNV), deleting fence by name (glDeleteFencesNV), setting a fence (glSetFenceNV), testing the status of a fence (glTestFenceNV), blocking until the status of a fence becomes true (glFinishFenceNV), determining if a name is a valid fence (glIsFenceNV), and getting the status and condition of a specified fence (glGetFenceivNV).

A fence has a varying Boolean "status" that is false if the fence's condition is still pending and true if the fence's condition has completed. In a preferred embodiment, a fence condition called "all completed" which is true when all preceding commands have completed and all pixel results have been written to the frame buffer is utilized to synchronize the CPU and graphics mode. As will be discussed later, other conditions could be utilized for the synchronization operation.

An application 113 creates a vertex array range. In a preferred embodiment, vertex array ranges are allocated and established using an OpenGL extension called NV_vertex_array_range. The application 113 then repeatedly writes dynamic vertex data into the vertex array range. For example, the vertex data may be for an animating computer generated puppet. Each frame of animation has the puppet in a different pose requiring different vertex data. The application 113 writes the vertex data for a given frame's pose into the vertex array range. Then the vertex indices for the puppet model are written to the graphics accelerator module's command stream.

Figure 5:
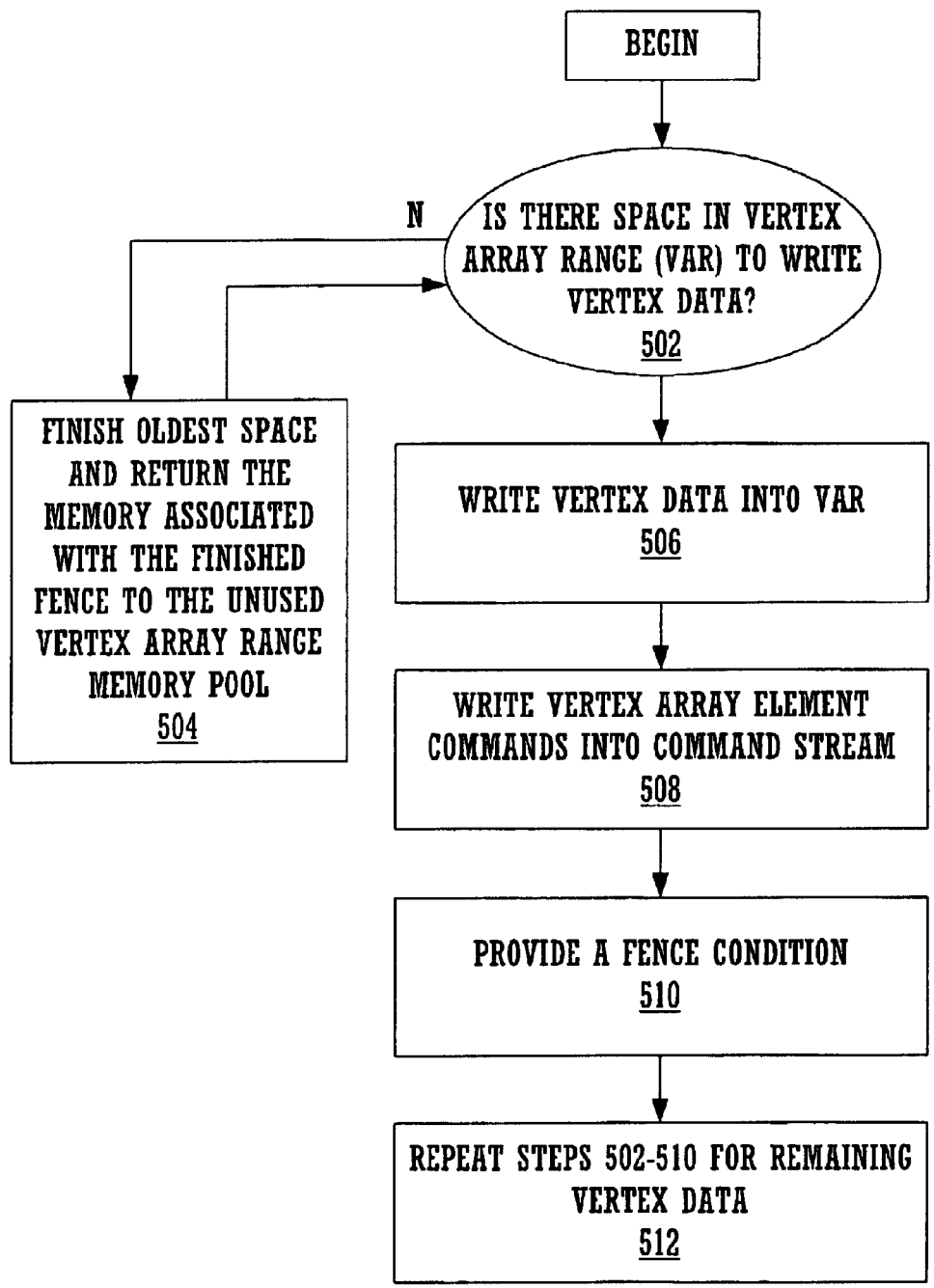
FIG. 5 illustrates how an application program would utilize the fences in accordance with the present invention.

FIG. 5 illustrates how an application program 113 would utilize the fences in accordance with the present invention. First, it is determined whether there is a region within the vertex array range (VAR) which is available to be written to by the CPU, via step 502. If there is none, then finish the oldest space in the VAR and return the memory associates with the finished fence to an unused vertex array range memory pool, via step 504. Steps 502 and 504 are repeated until there is space in the VAR. When there is space available, then vertex data is written into the VAR, via step 506. Thereafter, vertex ArrayElement commands are written into the command stream by the processor, via step 508. Thereafter steps 502–510 are repeated for all remaining vertex data. Then a fence condition is provided in the command stream, via step 510, and the above-identified process is repeated until the desired number of fence conditions are provided, via step 512.

Figure 6:
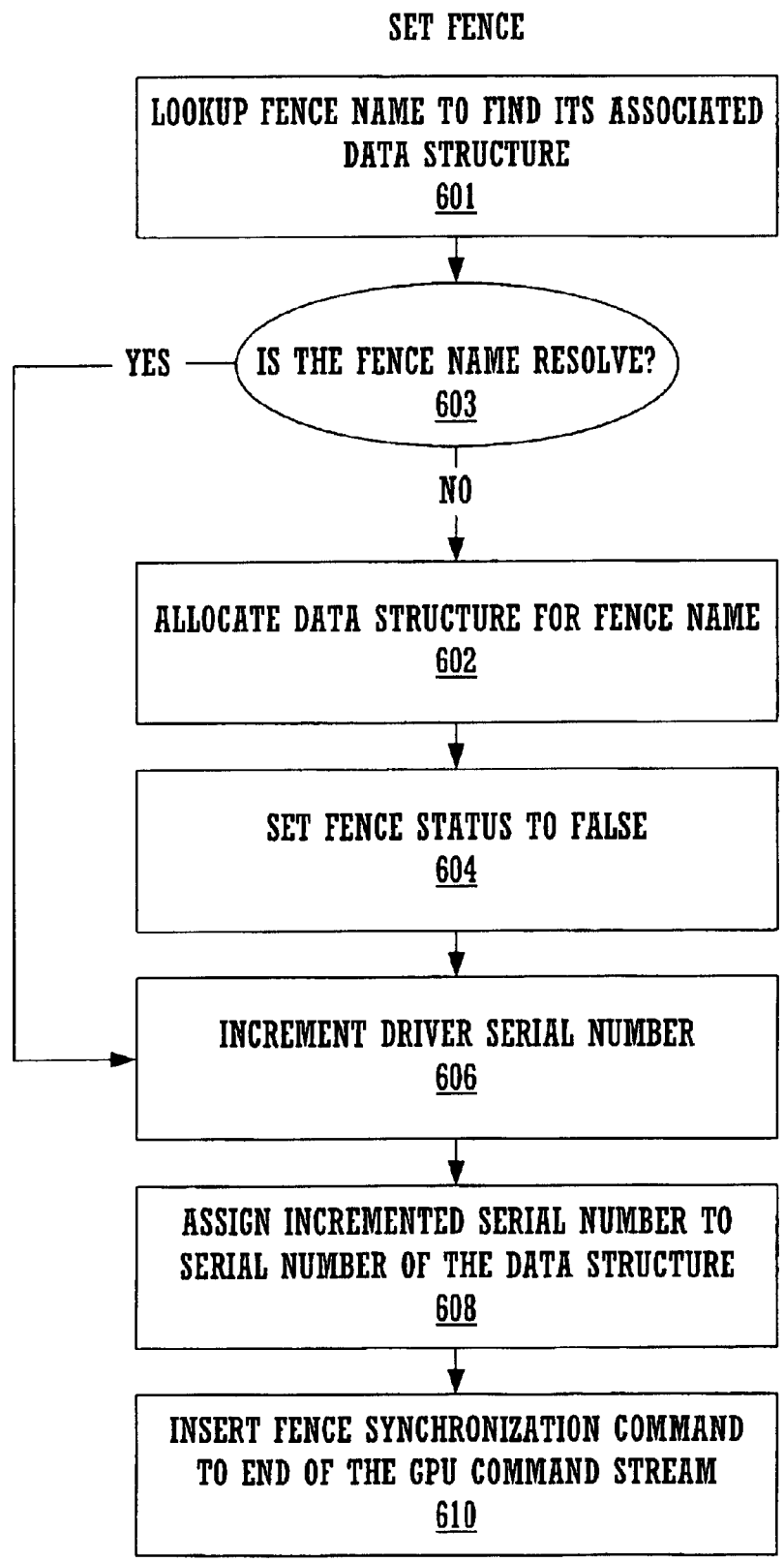
FIG. 6 is an example of a driver setting a fence in accordance with the present invention.

One of the fence conditions is setting a fence. A fence can be set, for example, by utilizing the glSetFenceNV command from the driver. "Setting a fence" is the process of inserting a synchronization command into the graphics accelerator module's command stream and setting the fence's status to false. FIG. 6 is an example of a driver 115 setting a fence. In a preferred embodiment, an application 113 may set any number of fences at one time. To set a fence, first a fence name is looked up to find its associated data structure, via step 601. Next, it is determined if the fence name is resolved, via step 603. If the fence name is not resolved, a data structure is allocated for a particular fence name, via step 602. A plurality of fence names are stored in a table within the module 106. Typically, this table comprises a hash table. The data structure includes status information and a serial number. The data structure has a status which is true or false. The fence status is set to false indicating that the fence has not finished, via step 604. Next, a serial number of the driver 115 is incremented, via step 606. Thereafter, the incremented serial number of the driver 115 is assigned to the serial number of the data structure associated with the fence, via step 608. Finally, a fence synchronization command is inserted at the end of the graphics accelerator module's command stream, via step 610. If the fence name is resolved, then proceed to step 606 and execute steps 608 and 610.

Accordingly, when the pose of the next frame has different vertex data, that data is written to a different region of the vertex array range and another fence (i.e, with a different integer name) is "set". This is repeated until there is no longer any memory remaining in the vertex array range that has not been written with a previous frame's vertex data.

Figure 7:
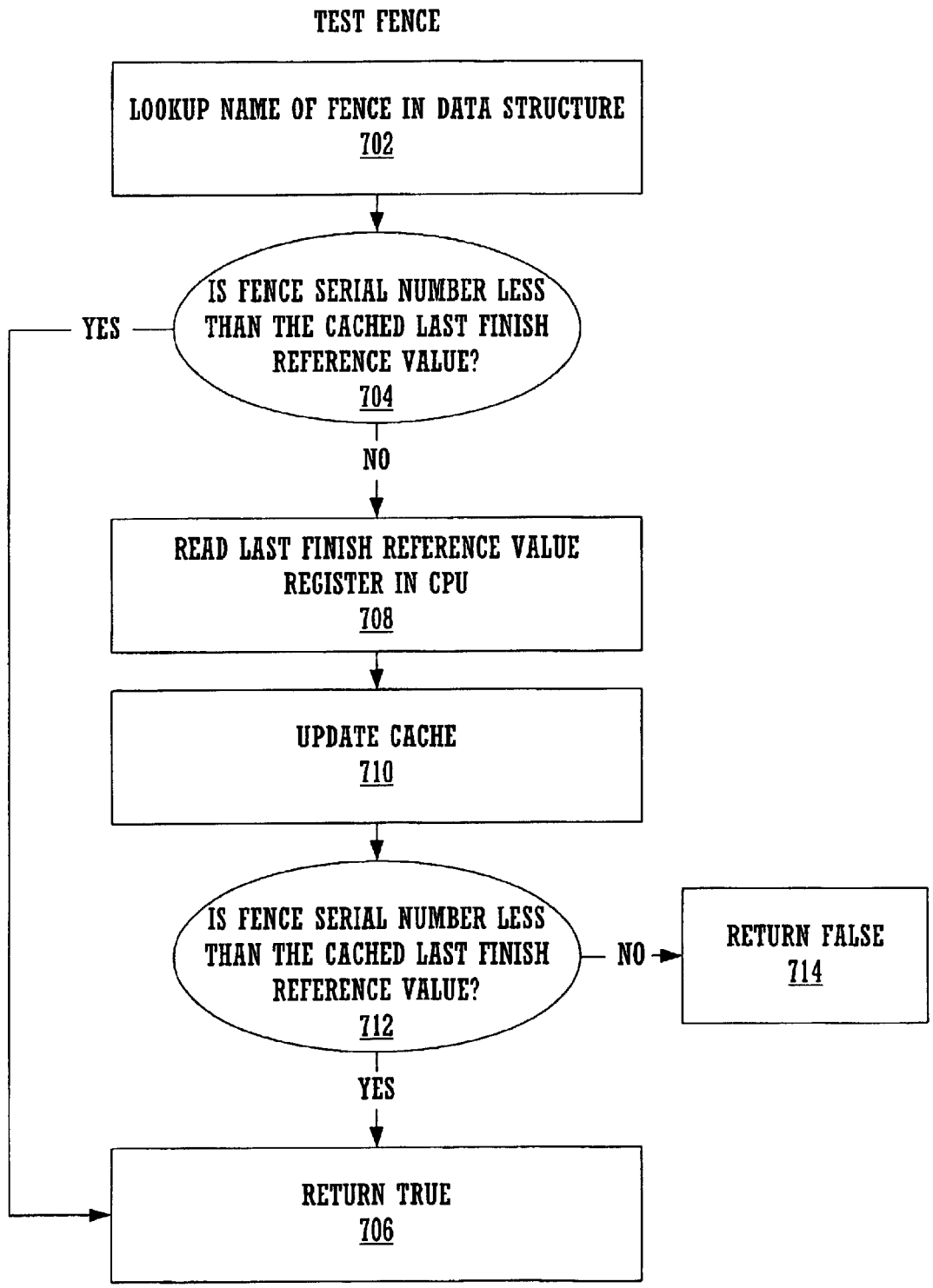
FIG. 7 illustrates the driver testing of a fence in accordance with the present invention.

A fence can be tested or finished to determine whether it is appropriate to write over a particular portion of the memory. First, testing of a fence will be described. FIG. 7 illustrates the testing of a fence. Initially, the name of the fence in the data structure is looked up, via step 702. Next, it is determined whether the fence serial number is less than the cached last finish reference value, via step 704. If the serial number is less than the cached last finish reference value, then return the test is true, via step 706. On the other hand, if it is not, then the last finish reference value register is read by the processor, via step 708. The cache is then updated to reference that new last finish reference value, via step 710. Next, it is determined whether the fence serial number is less than the cached last finish reference value, via step 712. If the fence serial number is more than the cached last finish reference value, a false is returned, via step 714. If the fence serial number is less, then a true is returned, via step 706. This simply returns whether the fence has finished or not without actually waiting for the fence to finish. This is useful when an application has other useful work to do rather than simply wait for the fence to finish.

Figure 8:
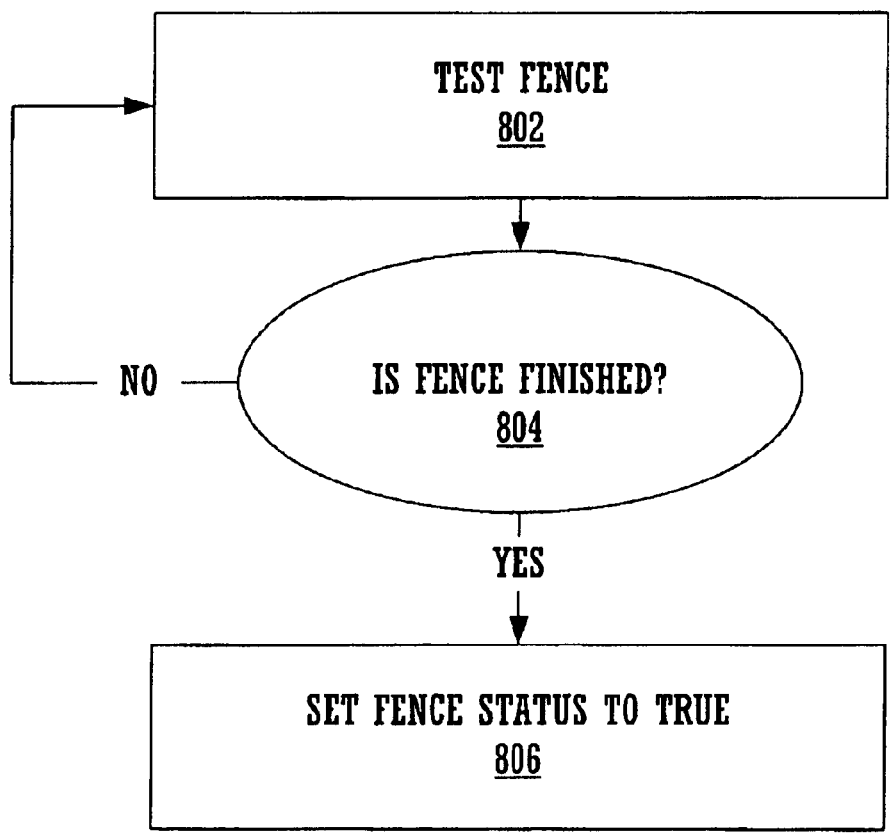
FIG. 8 illustrates the finishing fence in accordance with the present invention.

FIG. 8 illustrates the finishing fence. First, the fence is tested, via step 802, and then it is determined whether the fence is finished, via step 804. This process is repeated until all the fences are finished. Thereafter, the fence status is set to true. A first fence is finished by calling a command glFinishFenceNV with the integer name for the first fence. When the glFinishFenceNV call returns to the application 113, that indicates that the memory written preceding the setting of the fence can now be reused. This process continues by finishing the various fences for each frame's vertex data for a given puppet pose.

Typically, there are enough fences set that by the time a fence is finished, the fence has in fact already been completed. In this case, the "finish" returns immediately. It is only when the fence has not completed (its status is still false) that the "finish" operation actually waits. If used correctly, fences can be used so that the application 113 rarely if ever waits for a fence to finish.

Implementing Fences

Referring back to FIG. 2, in a preferred embodiment, fences are implemented by providing a special command that can be inserted into the graphics accelerator module's 106 command stream referred to "SetReference". There is an associated 32-bit word of data for the SetReference command. When the SetReference command is processed, the graphics accelerator module 106 waits until all preceding commands to the graphics accelerator module 106 have completed and that all pixel data has been written to the graphics memory. Then, the 32-bit value is written to a "last finished reference" register 117 that can be read by a driver 115. In a preferred embodiment, the driver 115 is an OpenGL driver which is conventionally utilized in graphics applications. The OpenGL driver 115 can then determine if the last SetReference command has been processed by continuously reading the "last finished reference" register 117 until the value of the last SetReference command appears in the register 117.

The OpenGL driver maintains a 32-bit "serial number" that is initially zero. Each time a fence is set, the driver's 115 serial number is incremented and a SetReference command is inserted in the graphics accelerator module's command stream with the latest serial number. This same serial number is also saved in the fence's associated data structure. When a fence is tested or finished, the "last finished reference" register 117 is read and compared to the serial number saved in the fence's associated data structure. If the register 117 is relatively greater than or equal to the fence's saved serial number, the fence is finished. Note that because serial numbers are assigned monotonically increasing values and commands in the graphics accelerator module's command stream must complete in order, if the reference value is relatively greater than the fence's saved serial number, we know that the fence must have completed.

If the register 117 is relatively less than the fence's saved serial number, the fence is not finished. In the case of glTestFenceNV, the fence status is returned as false. In the case of glFinish FenceNV, the graphics accelerator module's command stream is flushed, and the "last finished reference" register 117 is read repeatedly until the register 117 is relatively greater than or equal to the fence's saved serial number.

Because register reads are very expensive operations relative to the speed of most basic CPU operations, the OpenGL driver remembers that last value read from the "last finished reference" register 117. If a fence is tested or finished, the driver 115 first checks if the fence is finished based on the last read value for the "last finished reference register". Otherwise, it must read the register 117.

Also, the comparison between the fence's saved serial number and the "last finished reference" register 117 must be compared in a "relative" manner to guard against the serial number eventually wrapping back to zero. When the graphics accelerator module processes the synchronization command, it requires the fence's condition to be met. In the case of the "all completed" condition, that means that all preceding commands have been completed and all pixel results have been written to the frame buffer. At this point, the fence's status becomes true.

As is seen, a method and system in accordance with the present invention is useful for synchronizing vertex data changes. However, this fence mechanism can be utilized for synchronizing pixel data changes. Also, currently the only condition supported is "all completed", but it is also possible to support other less drastic conditions such as "vertex fetching completed" and "texture fetching completed These conditions might complete faster than the existing "all completed" condition.

A system and method in accordance with the present invention thus permits extremely high vertex processing rates via vertex arrays or vertex buffers even when the processor lacks the necessary data movement bandwidth. By passing indices in lieu of the vertex data, the processor is capable of keeping up with the rate at which a vertex engine of the graphics accelerator module can consume vertices. In operation, the processor passes vertex indices to the hardware and lets the hardware "pull" the actual vertex data via direct memory access (DMA).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for synchronizing updates of vertex data by a processor with a graphics accelerator module that is fetching vertex data, comprising the steps:
   (a) providing vertex array range (VAR);
   (b) writing vertex data into the VAR;
   (c) providing a command into a command stream of the graphics accelerator module indicating that the vertex data has written into the VAR; and
   (d) using a graphics driver for providing a fence name and a fence condition based upon the command, wherein the fence condition is configured to synchronize the writing of the vertex data by the processor with the fetching of the vertex data by the graphics accelerator module.

2. The method as recited in claim 1, which includes the step of:
   (e) repeating steps b–d until a desired number of fences are set.

3. The method of claim 1 wherein the fence condition comprises any of the following:
   generating an unused name for a fence; deleting a fence; setting a fence; testing the status of a fence; blocking until status of a fence becomes true; determining if a name is a valid fence, and getting the status and condition of a fence.

4. The method as recited in claim 1 wherein the command comprises a set reference command.

5. A system for allowing direct memory access to graphics vertex data, comprising:
   memory for storing vertex data;
   a graphics accelerator module for receiving an index representative of a portion of the vertex data in the memory; and
   a processor for determining a location in the memory in which the portion of the vertex data is stored, the processor including an application for utilizing at least one fence and a graphics driver for generating at least one fence and at least one fence name and for providing at least one fence condition, wherein the fence condition is configured to synchronize a direct memory access of the vertex data by the graphics accelerator module with an update of the vertex data by the processor.

6. The system as recited in claim 5, wherein the memory includes system memory.

7. The system as recited in claim 5, wherein the memory includes memory of the graphics accelerator module.

8. The system as recited in claim 5, wherein a graphics accelerator module includes register for indicating whether a fence is finished.

9. The system of claim 5 wherein the fence condition comprises any of the following:
   generating an unused name for a fence; deleting a fence; setting a fence; testing the status of a fence; blocking until status of a fence becomes true; determining if a name is a valid fence, and getting the status and condition of a fence.

10. The system of claim 8 wherein the processor provides a command into the command stream of the graphics accelerator module to implement the at least one fence.

11. The system of claim 10 wherein the command comprises a SetReference command.

12. The system of claim 11 wherein the at least one fence comprises a data structure, the data structure including a status portion and a serial number.

13. The system of claim 12 wherein the latest data associated with the SetReference command is stored in the register.

14. The system of claim 13 wherein the driver continuously reads the register to determine if the latest SetReference command has been processed.

15. A method for synchronizing direct memory access fetching of vertex data by a graphics accelerator module with updates of the vertex data written by a processor, comprising:
   writing vertex data into a plurality of regions of a VAR (vertex array range);
   issuing a plurality of commands from the processor into a command stream of the graphics accelerator module indicating to the graphics accelerator module which of the plurality of regions have written vertex data;
   using a graphics driver for implementing a plurality of fence conditions based on the commands; and
   allocating a fence name data structure for each of the plurality of fence conditions;
   storing the fence name data structures into a table data structure;
   synchronizing the writing of updated vertex data into the regions of the VAR by the processor with the direct memory access fetching of the vertex data from the regions of the VAR by the graphics accelerator module in accordance with fence conditions.

16. The method as recited in claim 15, further comprising:
using the fence conditions to prevent overwriting regions of the VAR by the processor with updated vertex data prior to the direct memory access fetching of the vertex data by graphics accelerator module.

17. The method as recited in claim 15 wherein the plurality of fence conditions comprise any of the following: generating an unused name for a fence; deleting a fence; setting a fence; testing the status of a fence; blocking until a status of a fence becomes true; determining if a name is a valid fence, and getting the status and a condition of a fence.

18. The method as recited in claim 15 wherein the command comprises a set reference command.

19. The method as recited in claim 15 further comprising:
dynamically updating the vertex data in the VAR while performing the direct memory access of the VAR by the graphics accelerator module by synchronizing the writing of update vertex data into the regions of the VAR using the fence conditions.

20. A method for synchronizing updates of vertex data by a processor with a graphics accelerator module that is fetching vertex data, comprising:
providing vertex array range (VAR);
writing vertex data into the VAR;
providing a command into a command stream of the graphics accelerator module indicating that the vertex data has written into the VAR,
using a graphics driver for providing a fence based upon the command, wherein the fence is configured to synchronize the writing of the vertex data by the processor with the fetching of the vertex data by the graphics accelerator module;
allocating a fence name data structure for the fence; and
storing the fence name data structure into a table data structure.

21. The method of claim 20 wherein providing the fence further comprises generating an unused name for the fence.

22. The method of claim 20 wherein providing the fence further comprises deleting at least one fence.

23. The method of claim 20 wherein providing the fence further comprises setting the fence.

24. The method of claim 20 wherein providing the fence further comprises blocking until a status of the fence becomes true.

25. The method of claim 20 wherein providing the fence further comprises determining if a name is a valid fence.

26. The method of claim 20 wherein providing the fence further comprises getting a status and a condition of the fence.

27. A system for allowing direct memory access to graphics vertex data, comprising:
memory or storing vertex data;
a graphic accelerator module for receiving an index representative of a portion of the vertex data in the memory; and
a processor for determining a location in the memory in which the portion of the vertex data is stored, the processor including an application for utilizing at least one fence and a graphics driver for generating at least one fence and for providing at least one fence, wherein the at least one fence is configured to synchronize a direct memory access of the vertex data by the graphics accelerator module with an update of the vertex data by the processor, and wherein a fence serial number data structure for the at least one fence is stored into a table data structure to track a utilization of the at least one fence.

28. The system as recited in claim 27, wherein the memory includes system memory.

29. The system as recited in claim 27, wherein the memory include memory of the graphics accelerator module.

30. The system as recited in claim 27, wherein the graphics accelerator module includes a register for storing a previously utilized serial number data structure of a previously utilized fence, and for comparing the fence serial number data structure for the at least one fence to the previously utilized fence serial number data structure to determine a condition of the at least one fence.

31. The system as recited in claim 27 wherein providing the fence further comprises generating an unused name for the fence.

32. The system as recited in claim 27 wherein providing the fence further comprises deleting at least one fence.

33. The system as recited in claim 27 wherein providing the fence further comprises setting the fence.

34. The system as recited in claim 27 wherein providing the fence further comprises blocking until a status of the fence becomes true.

35. The system as recited in claim 27 wherein providing the fence further comprises determining if a name is a valid fence.

36. The system as recited in claim 27 wherein providing the fence further comprises getting a status and a condition of the fences.

* * * * *